United States Patent [19]

Schultz

[11] Patent Number: 5,193,715
[45] Date of Patent: Mar. 16, 1993

[54] WIDEMOUTHED BARREL OF A SYNTHETIC RESIN

[76] Inventor: Udo Schultz, Ruckersteg 4, D-5418 Selters, Fed. Rep. of Germany

[21] Appl. No.: 783,922

[22] Filed: Oct. 29, 1991

[30] Foreign Application Priority Data

Oct. 29, 1990 [DE] Fed. Rep. of Germany ....... 4034226

[51] Int. Cl.$^5$ ............................................. B65D 25/00
[52] U.S. Cl. .................... 220/675; 220/4.05; 220/649; 206/515
[58] Field of Search ............... 220/669, 646, 649, 675, 220/4.05, 4.06, 4.07, 4.05, 649, 675; 206/515

[56] References Cited

U.S. PATENT DOCUMENTS

| | | | |
|---|---|---|---|
| 3,704,808 | 12/1972 | Gibson et al. | 220/649 X |
| 3,934,747 | 1/1976 | Needt | 220/675 X |
| 4,014,452 | 3/1977 | Galer | 220/675 X |
| 4,177,934 | 12/1979 | Hammes et al. | 220/320 X |

Primary Examiner—Steven M. Pollard
Attorney, Agent, or Firm—Young & Thompson

[57] ABSTRACT

The widemouthed barrel (1) of a thermoplastic synthetic resin, developed with the objective of minimum space requirement during empty transport and maximum shipping safety, has a conical sidewall section (2) making it possible to stack several barrels one inside the other, as well as a reinforcing and load-securing ring (11), arranged below the barrel border (3), and a base ring (14). In the extrusion blow-molding process for producing the widemouthed barrel, a closed double-barrel body is blow-molded with two conical sidewall sections (2), two barrel borders (10), and a central ring. After removal of the double-barrel body from the mold, this body is separated into two barrels (1) by cutting out the central ring, and the central ring is shrunk onto a cooled barrel (1) as the load-securing ring (11).

4 Claims, 5 Drawing Sheets

WIDEMOUTHED BARREL OF A SYNTHETIC RESIN

The invention relates to widemouthed barrels of a thermoplastic synthetic resin, with a radially outwardly projecting border formed below the barrel opening for the mounting of a clamping ring for the barrel lid.

The empty transport of the pertinent widemouthed barrels utilized as disposable and reusable barrels in accordance with U.S. Pat. No. 4,177,934, which barrels can be stacked one on top of the other for transporting and storage purposes, is uneconomical on account of the large amount of space required and the ensuing high transportation costs.

An additional drawback of the known widemouthed barrels resides in that there is the danger when transporting filled barrels overland that, in case of a twisting of the loading surface due to driving vibrations and shocks transmitted to the barrels and due to inertial forces acting on the barrels during braking of the vehicle, as well as during transportation by ship on account of the rolling motion of the ship, the clamping rings of the sealing lids of juxtaposed barrels will slide one on top of the other, and the barrels will climb upwards on one another. This climbing effect can lead to damaging of the clamping rings and to leaks of the barrel lids. As a result, the transportation can be fraught with dangers bearing unforeseeable damaging consequences, especially when shipping dangerous materials.

The invention is based on the object of further developing the pertinent widemouthed barrel with respect to minimum space requirement during empty shipping and maximum transporting safety.

The widemouthed barrel according to this invention is distinguished by the following advantages:

On account of the conical configuration of the barrel sidewall, empty barrels can be stacked one inside the other so that, by virtue of the substantially reduced space requirement, the shipping and storage expenses are considerably reduced as compared with the conventional, cylindrical widemouthed barrels. The reinforcing and load-securing ring projecting radially beyond the clamping ring of the sealing lid prevents climbing of the barrels and leaks of the sealing lid during shipping, protects clamping ring and lid against damage during transport, and increases the axial crushing resistance and radial rigidity of the barrel in the upper section of the barrel sidewall. The radially outwardly projecting base ring reinforces the bottom zone of the barrel and most extensively prevents mutual tilting of the barrels with the lower sidewall section during shipping. Finally, the reinforcing and load-securing ring below the barrel border and the base ring reinforcing the bottom zone make it possible to reduce the wall thickness of the barrel sidewall as compared with the conventional widemouthed barrels and thus afford a saving in material leading to a reduction in manufacturing costs.

The widemouthed barrel and the process for its manufacture in accordance with the invention will be described in greater detail below with reference to schematic drawings wherein.

Figure 1:
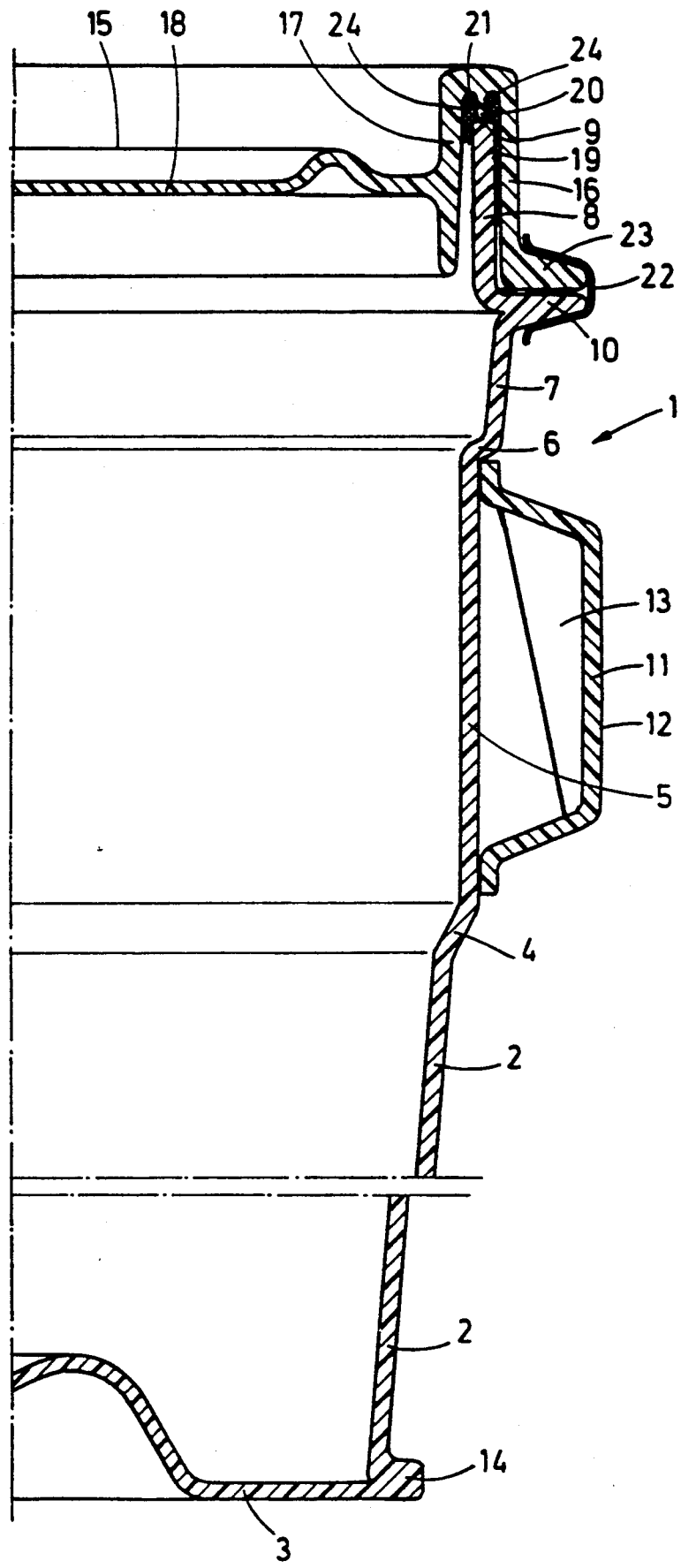
FIG. 1 shows the widemouthed barrel in a longitudinal sectional view.

The widemouthed barrel 1 according to FIG. 1 of a thermoplastic synthetic resin exhibits a conical sidewall section 2 closed at the bottom by a bottom end 3 and passing over, in the direction toward the barrel opening, via a conical ring section 4 into a cylindrical sidewall section 5; the latter is followed by way of an annular shoulder 6 by a sidewall section 7 slightly flaring conically in the direction toward the barrel opening and by the cylindrical barrel mouth 8 to which is molded at a spacing below the opening rim 9 the radially outwardly projecting, solid flange 10.

A reinforcing and load-securing ring 11 is seated on the cylindrical sidewall section 5 of the widemouthed barrel 1; this ring is fashioned as a hollow-profile ring and projects radially outwardly beyond the barrel flange 10. The reinforcing and load-securing ring has a trapezoidal profile 12 and is equipped over the entire inner periphery with radially oriented reinforcing ribs 13.

A radially outwardly directed, solid base ring 14 is molded on the barrel bottom 3.

The widemouthed barrel 1 is sealed with a lid 15 injection-molded from a synthetic resin and exhibiting an outer rim 16 surrounding the barrel neck 8 and an inner rim 17 dipping into the barrel neck 8 and projecting into the barrel chamber by way of lid bottom 18 located below the barrel opening. The outer and inner rims 16, 17 of the lid 15 form an annular chamber 19, an annular web 20 projecting axially from the base of this chamber. The annular web 20 is coated with a bicomponent sealing composition 21, for example polyurethane with a curing agent.

Upon closing of the lid 15 by means of a clamping ring 22 extending over a continuous flange 23 molded to the outer rim 16 of the lid at the bottom and overlying the barrel border 10, the annular web 20 is pressed, with subdivision of the sealing compound 21 into two sealing rings 24, onto the opening rim 9 of the barrel neck 8, the sealing rings 24 being pretensioned by way of the opening rim 9. With the clamping ring 22 being closed, the flange 23 of the lid 15 and the barrel border 10 are not in contact with each other so that axial forces acting on the lid 15 are transmitted safely directly into the barrel neck 8 and the barrel body.

Figure 2:
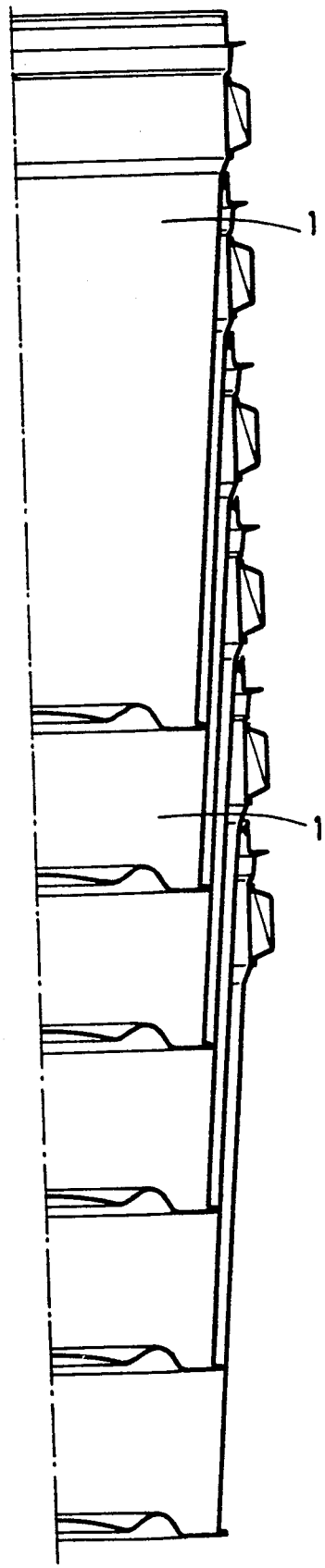
FIG. 2 shows a stack of several widemouthed barrels according to FIG. 1.
Figure 3:
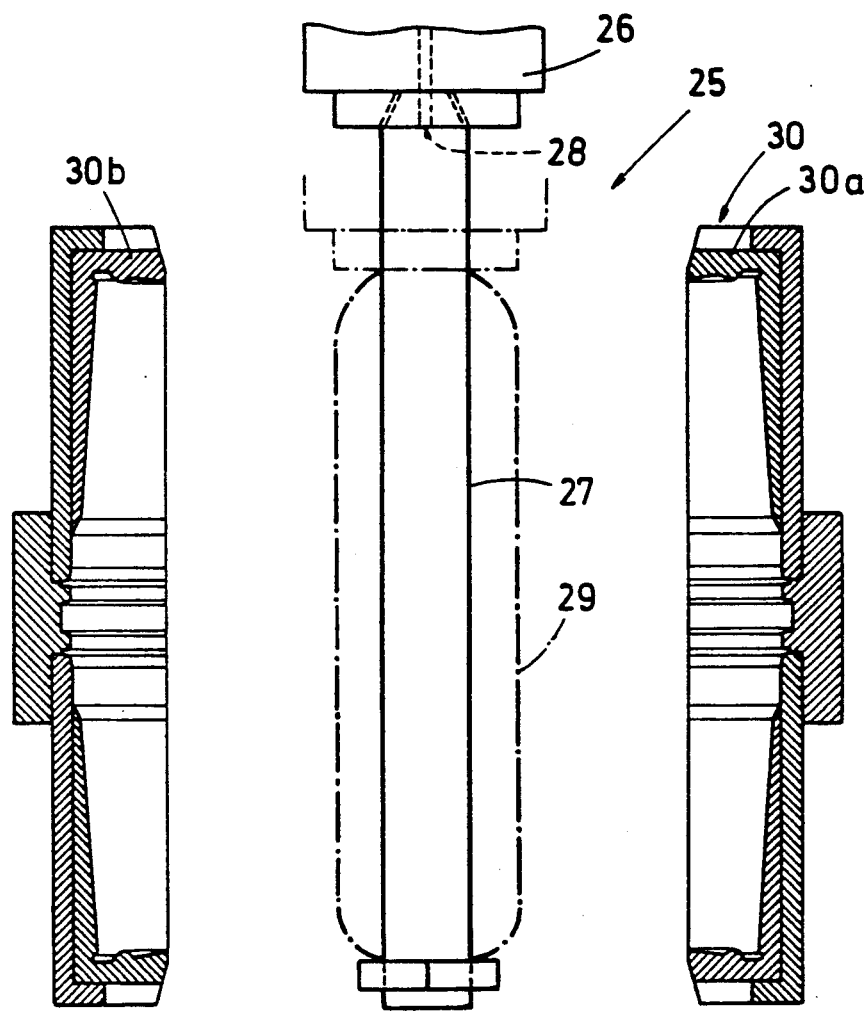
FIG. 3 shows the blow-molding machine with opened blow mold during extrusion and preblowing of the parison.
Figure 4:
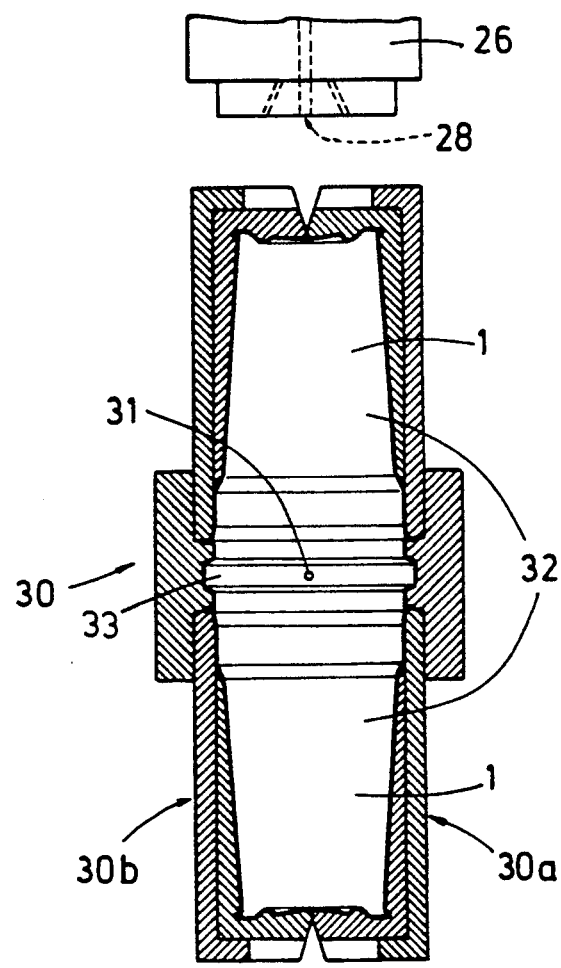
FIG. 4 shows the blow-molding machine with the blow mold being closed during the primary blow-molding of a double-barrel body.
Figure 5:
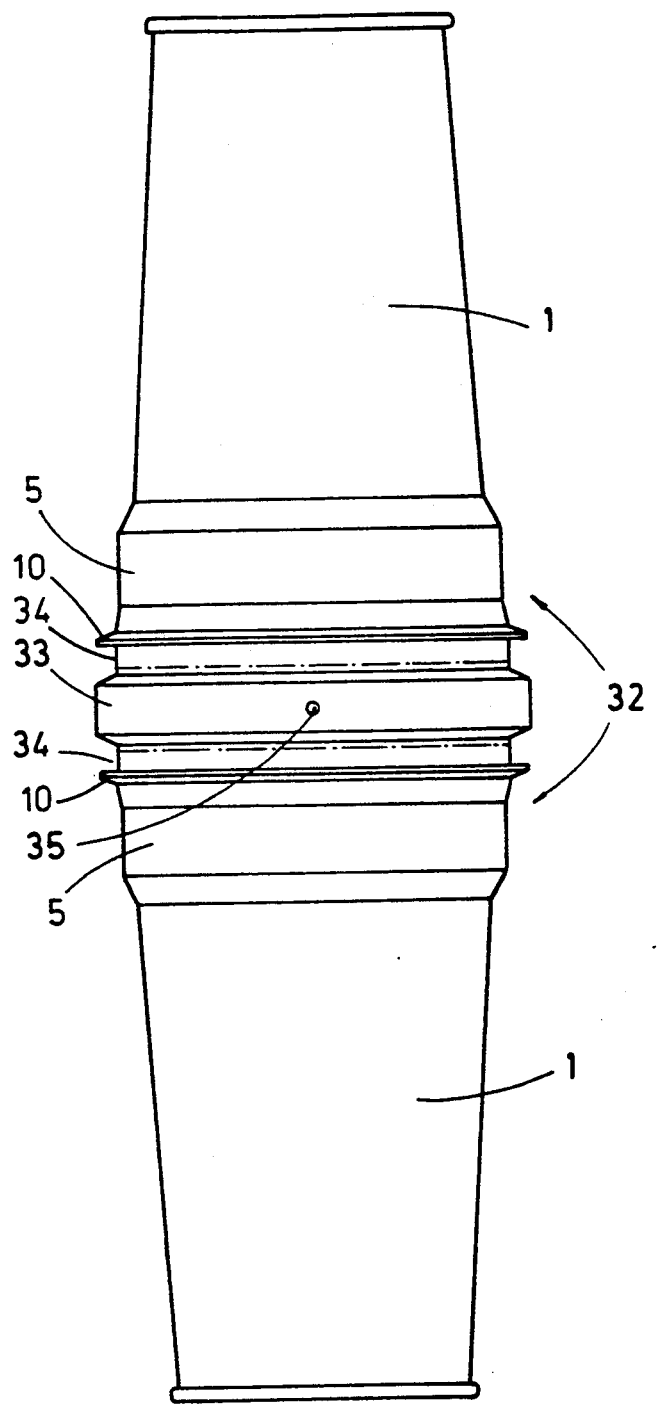
FIG. 5 shows the double-barrel body removed from the mold.

After removal of the lids 15 it is possible, in accordance with the illustration in FIG. 2, to stack several empty barrels 1 inside one another with the conical sidewall sections 2; in this arrangement, a barrel 1 rests in each case with the conical annular section 4 on the opening rim 9 of the barrel 1 receiving the conical sidewall section 2.

An extrusion blow molding process is utilized for producing the widemouthed barrels 1 according to FIG. 1 from a thermoplastic synthetic resin wherein during the first process step a hose 27 is extruded through the parison die head 26 of a blow-molding machine 25 in cyclic fashion. This hose, after sealing the lower end by means of a sealing tool, is preblown into a parison 29 by use of blowing air introduced via a nozzle 28 in the parison die head 26.

Subsequently, after pinching off the upper end of the parison 29 by means of a sealing unit and closing the two mold halves 30a, 30b of the divided blow mold 30, the parison 29 is subjected to a finishing molding step during the second process stage by the use of blowing air fed via a blowing mandrel 31 housed in the central portion of the hose-like parison 29 to form a double-barrel body 32 with a central ring 33 designed as a hollow-profile ring, two annular sidewall sections 34 bilaterally adjoining this central ring with the barrel border 10 and two sidewall sections 2 tapering conically toward the bottom ends j of the double-barrel body 32, the barrel borders 3 and the base rings 14 being molded by compression.

After a brief cooling period, the blow mold 30 is opened and the still warm, dimensionally stable double-barrel body 32 is removed from the blow mold.

Thereafter the double-barrel body 32 is divided into two barrels 1 of equal size by cutting out the central ring 33 which includes the blow orifice 35 of the shot-in blowing mandrel 31 for the primary blow-molding of the double-barrel body 32.

Finally, the still warm central ring 33, excised from the double-barrel body 32, is pushed as the load-securing ring 11 from the bottom over the barrel end 3 and the conical sidewall section 2 of a cooled barrel 1 blow-molded in a preceding operating step, up to abutment against the annular shoulder 6, onto the cylindrical sidewall section 5. During cooling, the load-securing ring 11 is shrunk onto the cylindrical sidewall section 5 of the barrel 1.

In a modification of the aforedescribed manufacturing method, there is the possibility of blow-molding the double-barrel body 32 with two identical central rings 33, fashioned as hollow-profile rings, and of dividing the double-barrel body 32, by cutting out both central rings 33, into two barrels 1 so that a load-securing ring 11 is available for both barrels 1 blow-molded in one working step.

The above-described double-mold blowing process permits an economical, low-expense mass production of widemouthed barrels with a reinforcing and load-securing ring at a spacing below the barrel border. In this process, by the use of the central ring, normally obtained as a waste product when dividing the double-barrel body into two barrels, as a reinforcing and load-securing ring, material costs are saved, and energy costs are saved by utilizing the residual thermal energy from the blow-molding step, contained in the central ring, for shrinking the central ring as a load-securing ring onto a cooled-off barrel.

In a further modified process for the manufacture of widemouthed barrels 1 according to FIG. 1, the reinforcing and load-securing ring 11 arranged underneath the barrel border 10 is produced as a plastic injection-molded part. Respectively two load-securing rings 11 are blow-molded to the subsequent single barrels 1 during the blow-molding of a double-barrel body 32. The granulated plastic material for injection-molding the load-securing rings 11 is obtained preferably from plastic waste parts, for example from the central rings 33 produced during the separation of the double-barrel bodies 32.

What is claimed is:

1. Widemouthed barrel of a thermoplastic synthetic resin, with a radially outwardly projecting flange formed below the barrel opening for the mounting of a clamping ring for the barrel lid, having
    a sidewall section (2) which is conical for the stacking of several barrels (1) one inside the other, a reinforcing and load-securing ring (11) arranged at a spacing below the barrel flange (10) on a cylindrical sidewall section (5) and projecting radially outwardly beyond the barrel flange (10), and a base ring (14) molded on the barrel bottom (3) and oriented radially outwardly.

2. Widemouthed barrel according to claim 1, wherein the load-securing ring (11) below the barrel border (10) is fashioned as hollow-profile ring.

3. Widemouthed barrel according to claim 2, wherein the load-securing ring (11) has a trapezoidal profile (12).

4. Widemouthed barrel according to claim 2, wherein the load-securing ring (11) exhibits reinforcing ribs (13).

* * * * *

UNITED STATES PATENT AND TRADEMARK OFFICE
CERTIFICATE OF CORRECTION

PATENT NO. : 5,193,715
DATED : March 16, 1993
INVENTOR(S) : Udo SCHUTZ

It is certified that error appears in the above—identified patent and that said Letters Patent is hereby corrected as shown below:

On the title page:

In Item 19, change the inventor's surname from "Schultz" to --Schutz--.

In Item 76, change the inventor's surname from "Schultz" to --Schutz--.

Signed and Sealed this

Twenty-third Day of November, 1993

Attest:

BRUCE LEHMAN

*Attesting Officer*         *Commissioner of Patents and Trademarks*